United States Patent [19]
Moran et al.

[11] Patent Number: 4,776,214
[45] Date of Patent: Oct. 11, 1988

[54] MASS AIR FLOW SENSOR

[75] Inventors: Kevin S. Moran, Algonquin; Peter J. Shak, Hoffman Estates, both of Ill.

[73] Assignee: Motorola, Inc., Schaumburg, Ill.

[21] Appl. No.: 20,248

[22] Filed: Feb. 27, 1987

Related U.S. Application Data

[63] Continuation of Ser. No. 764,166, Aug. 9, 1985, abandoned.

[51] Int. Cl.[4] .............................................. G01F 1/68
[52] U.S. Cl. ................................... 73/204.11; 73/202
[58] Field of Search .................................. 73/204, 202

[56] References Cited

U.S. PATENT DOCUMENTS

| 3,931,736 | 1/1976 | Olmstead | 73/204 |
|---|---|---|---|
| 3,975,951 | 8/1976 | Kohama et al. | |
| 3,992,940 | 11/1976 | Platzer, Jr. | 73/204 |
| 4,074,566 | 2/1978 | Obayashi et al. | |
| 4,283,944 | 8/1981 | Gruner et al. | |
| 4,294,114 | 10/1981 | Lauterbach | |
| 4,304,128 | 12/1981 | Hafner et al. | |
| 4,304,130 | 12/1981 | Peter et al. | |
| 4,345,465 | 8/1982 | Gruner et al. | |
| 4,445,369 | 5/1984 | Stoltman et al. | 73/204 |
| 4,476,720 | 10/1984 | Ismail et al. | 73/204 |
| 4,498,337 | 2/1985 | Gruner | 73/204 |
| 4,548,078 | 10/1985 | Bohrer et al. | 73/204 |
| 4,677,850 | 7/1987 | Miura et al. | 73/204 |

FOREIGN PATENT DOCUMENTS 0147221 8/1984 Japan ................................. 73/204

Primary Examiner—Herbert Goldstein
Attorney, Agent, or Firm—Donald B. Southard; Phillip H. Melamed; John H. Moore

[57] ABSTRACT

Several embodiments for mass airflow sensors are illustrated herein. In each case a sensing element (11) for the mass airflow sensor (10, 34, 50) is provided on a first portion (18) of a thin flexible film substrate (19) while an extension of this substrate provides integral electrical conductive metallizations (24) that connect the sensing element (11) to associated sensor electronic components (21) mounted on a second portion (23) of the film substrate remotely located from the first film portion. This eliminates the need for individual soldered wire connections to connect the sensing element to its associated electronics. In addition, housing portions (12, 13) for the sensor (10, 34, 50) mate together and provide protection for both the sensing element (11) and the sensor electronics (21) thereby providing an integral sensor module including the sensing element and its associated electronics. Preferably, the housing provides a cavity (29) remotely located from the sensing element so as to isolate the sensor electronics from the environment surrounding the sensing element. In addition, a self-powered and self-contained sensor (50) is provided which includes a power source (54) and visual display (56). Preferably, all assembly of sensor electronic components is accomplished by mounting techniques which mount these components to a planar flexible film substrate on which the sensing element is also deposited. Subsequently, the flexible substrate may have portions thereof bent out of the plane of other portions, and some portions of the flexible film substrate may be configured in nonplanar configurations.

17 Claims, 4 Drawing Sheets

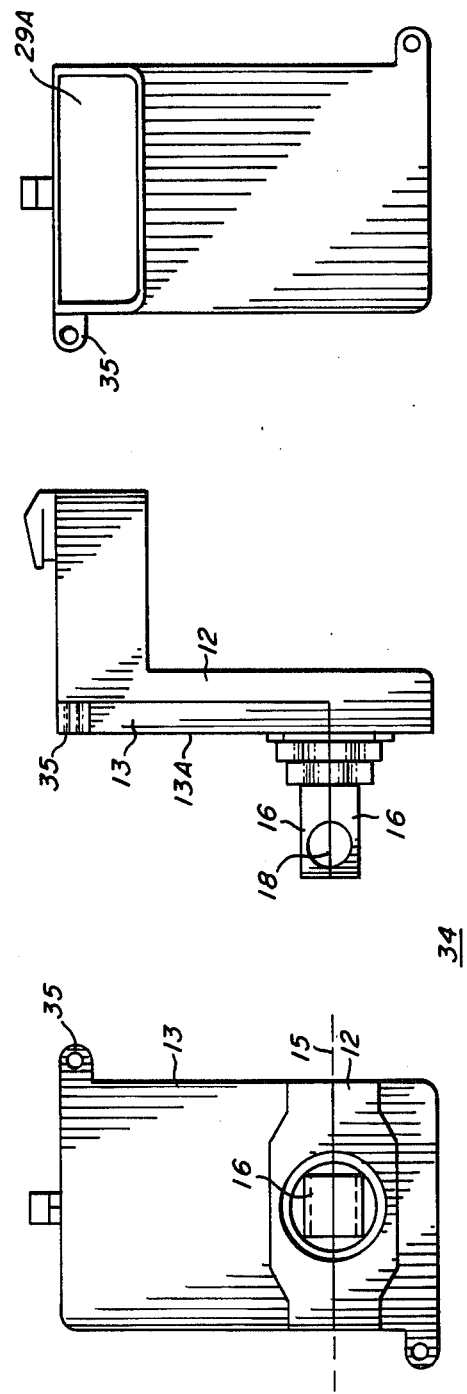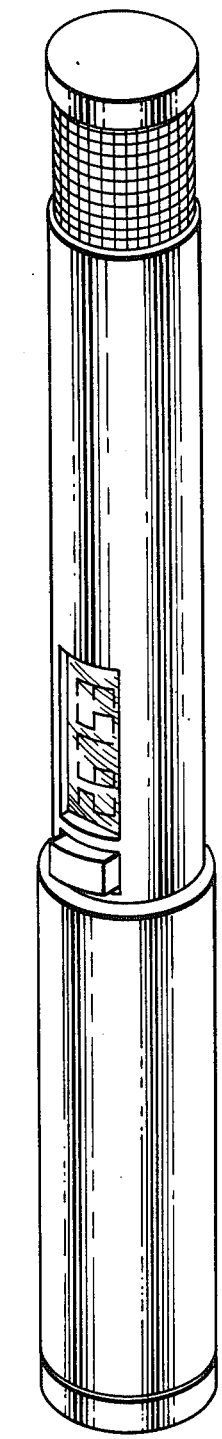
Fig. 4
Fig. 6

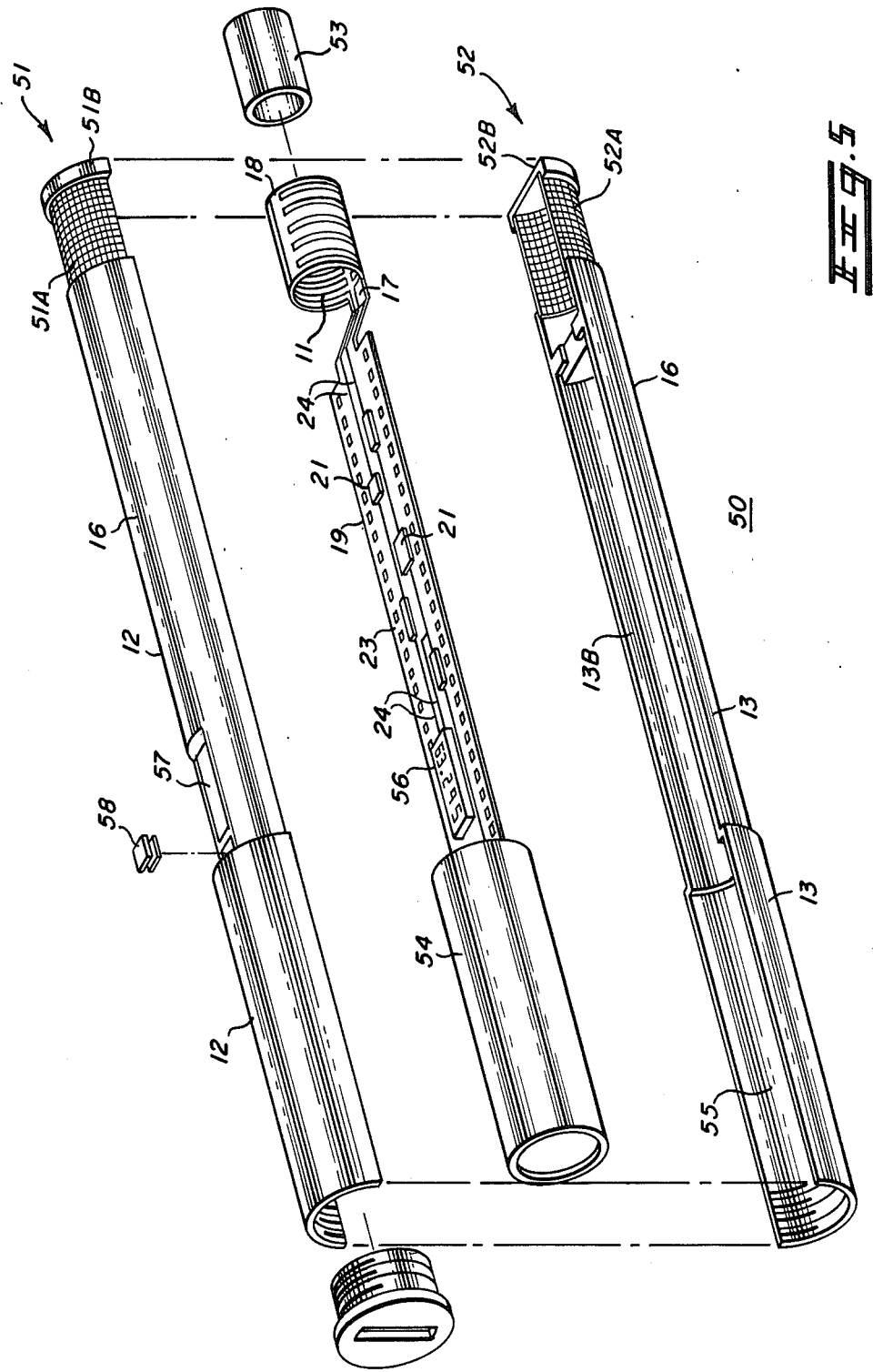

MASS AIR FLOW SENSOR

This is a continuation of application Ser. No. 06/746,166, filed Aug. 9, 1985, now abandoned.

BACKGROUND OF THE INVENTION

The present invention is related to the general field of sensors, and more particularly to sensors adaptable for sensing mass flow of a fluid medium, which may comprise air.

Many types of sensors for sensing mass airflow are known, and these sensors are oftentimes utilized in automotive engine control applications wherein it is cirtical to provide an accurate indication of the sensed airflow in the engine manifold. The cost of such sensors is a substantial factor. A great many prior mass airflow sensors utilize a temperature dependent resistor, or resistive film, which is exposed to the fluid medium to be sensed. Typically, these resistors, or associated circuitry, receive a power signal so that the resistors are maintained at a predetermined temperature. However, when the resistors are exposed to changes in fluid flow, the mass of the fluid results in transiently altering the temperature of the resistor which, in turn, results in altering an electrical signal, such as the electrical signal utilized to maintain the resistor at its previous steady state temperature. In this manner, an electrical signal is provided as an indication of sensed mass airflow. Sensors such as the ones described above also may utilize compensating or ambient measuring resistors to obtain more accurate mass airflow indication. A substantial concern of airflow sensors, such as those discussed above, is to have the sensor create as small a disturbance as possible in the sensed airflow such that the output signal reading will not be influenced by the sensor.

Prior mass airflow sensors such as those discussed above have been implemented by utilizing discrete hot wire resistive temperature sensing elements which must then be connected to associated sensor electronics in order to produce the desired mass airflow related electrical output signal. In some cases, film metallizations have been deposited on carrier substrates wherein these film metallizations serve as the mass airflow sensing resistive element. In such cases, the film substrates sometimes comprise sheets of thin polyimide flexible film, such as Kapton. However, in all of the prior situations additional interface connections between the actual sensing element and the remaining portion of the sensor electronics has greatly increased the cost of such sensors due to the typically extensive labor intensive operations necessary to implement reliable electrical connections between the sensor element and the sensor electronics. These connections can involve soldering fine wires between the sensor element and sensor electronics. These wires are susceptible to radio frequency interference signals. Also, providing connections from an external power source and read-out device to the sensor electronics can add to the cost of the sensor. Typically separate support structures for the sensor element and sensor electronics are required adding to the cost of the flow sensor.

SUMMARY OF THE INVENTION

An object of the present invention is to provide an improved sensor which overcomes the above-mentioned deficiencies of prior sensors.

In one embodiment of the present invention there is provided a sensor which provides an electrical signal related to at least one sensed property of a fluid, which may comprise air. This sensor comprises: housing means having at least one at least partially open portion permitting access to a fluid to be sensed; fluid sensing element deposited on a top surface of a first portion of a thin flexible film substrate; said first film portion, carrying said sensing element, mounted in said at least partially open portion of said housing means; electrical components positioned external to and remote from said at least partially open portion of said housing means and electrically connected to said sensing element, said electrical components providing an electrical signal related to the fluid sensed by said sensing element; said film substrate having an integral extension thereof extending from said first film portion within said at least partially open portion of said housing means to a second portion of said film substrate integral with said first film portion but positioned exterior to said at least partially open portion of said housing means, said electrical components mounted on said second film portion; and electrical conductive metallizations provided on said film substrate and electrically connecting said fluid sensing element on said first film portion to said electrical components mounted on said second film portion; whereby additional nonintegral electrical interface structure is not required to connect the fluid sensing element to the remotely located electrical components which form the remaining portion of the sensor electronics.

In an addition embodiment of the present invention, a mass flow sensor is provided which provides an electrical signal related to the mass flow rate of a fluid, which may comprise air, flowing past a sensing element. This mass flow sensor comprises: housing means having at least one hollow bore, having a longitudinal centerline, surrounded by housing walls, fluid intended to flow through said bore substantially in a direction parallel to the longitudinal centerline of said bore; fluid flow sensing element deposited on a top surface of a first portion of a thin flexible film substrate; said first film portion, carrying the sensing element, mounted in said bore; electrical components positioned external to said bore and electrically connected to said sensing element, said electrical components providing an electrical signal related to the fluid mass flow sensed by said sensing element; said film substrate having an integral extension thereof extending from said film first portion within said bore to a second portion of said film substrate integral with said film first portion but positioned exterior to said bore, said electrical components mounted on said second film portion; electrical conductive paths integrally provided on said film substrate and electrically connecting said fluid sensing element on said first film portion to said electrical components mounted on said second film portion; whereby additional nonintegral electrical interface structure is not required to connect the fluid sensing element to the remotely located electrical components which form the remaining portion of the sensor electronics.

Basically, the present invention contemplates providing a sensing element on an exposed portion of a thin flexible film substrate, and then providing an extending second portion of this flexible film substrate positioned remotely from the exposed first film portion. The electrical components of sensor associated circuitry are provided on this second film portion, and the electrical interconnections between the first and second portions of the film substrate, and the connections between the electrical components themselves, are provided by electrical conductive paths integrally provided on the film substrate. Essentially this involves extending the thin flexible film substrate on which the sensor element is mounted such that the remaining sensor electronics are mounted on this extension with interconnections being provided by film metallizations deposited on the film substrate.

Preferably, the sensing element deposited on the film substrate comprises a specific film metallization having predetermined resistive characteristics. The electrical conductive paths connecting this sensing film metallization to the sensor electronics comprise conductive film metallizations also provided on the thin flexible film substrate. The sensor electronics on the second film portion of the substrate can comprise individual chip components which are preferably reflow soldered to the conductive film metallizations that provide the electrical conductive paths to the sensing element. In addition, the sensor housing forms a protective cavity for the sensor electronics on the second film portion and isolates these components from the environment surrounding the sensing element, which many times may comprise an environment not conducive to the reliable operation of some the sensor electrical components.

Since both the first and second film portions are integral parts of the flexible film substrate, all connection of discrete components to the film substrate can be accomplished by conventional reflow solder techniques which typically rely upon the use of a planar base substrate. After the sensor electronics has produced its resultant output signal, this signal can be provided to conventional output leads which extend from the film substrate, but due to the present invention such conventional wire leads, which are susceptible to radio frequency interference, are not utilized for the critical interface connections between the sensing element and its associated sensor electrical components. Thus, the present invention provides a reliable and low cost interface connection between the sensing element and its associated electronics.

A particular embodiment of the present invention illustrates its use in providing a self-powered mass airflow sensor in which a read-out device is directly electrically connected to conductive path metallizations on the film substrate. Power is supplied to the sensor by a battery positioned in a compartment formed by the same housing means in which the film substrate and sensing element are effectively mounted.

The above features of the present invention, as well as additional features, can best be understood by further reference to the following description of the present invention.

BRIEF DESCRIPTION OF THE DRAWINGS

For a more complete understanding of the present invention, reference should be made to the drawings in which:

FIG. 4 is a series of planar views of an assembled sensor, a portion of which is shown in FIG. 3;

FIG. 5 is an exploded view of a self-contained and self-powered airflow sensor constructed in accordance with the present invention; and FIG. 6 is a perspective view of the assembled sensor shown in FIG. 5.

DESCRIPTION OF THE PREFERRED EMBODIMENT OF THE INVENTION

Figure 1:
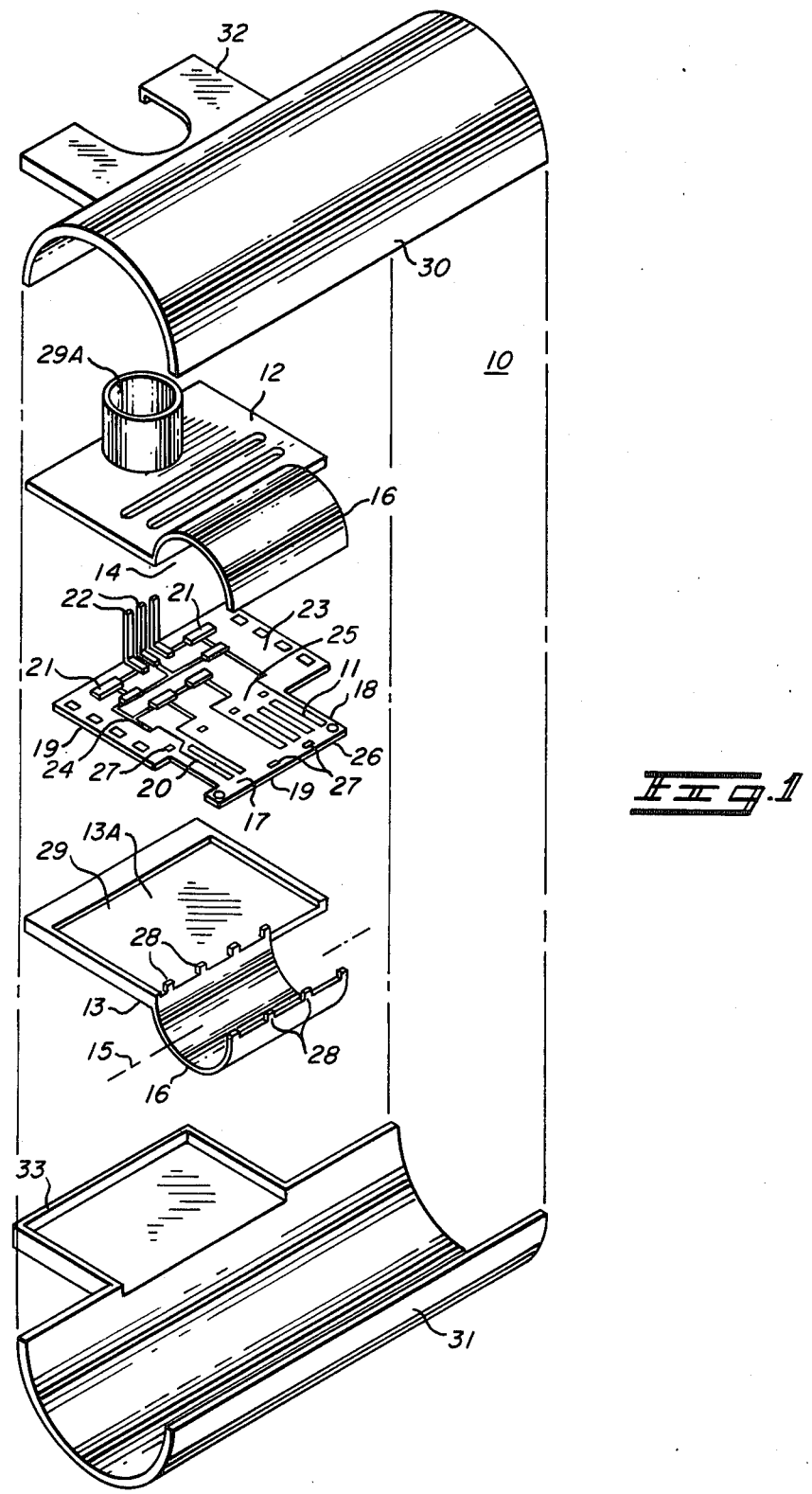
FIG. 1 is an exploded perspective view of a mass airflow sensor constructed in accordance with the present invention.

Referring to FIG. 1, an exploded view of a mass airflow sensor 10 is illustrated. The mass airflow sensor is designed for sensing the amount of mass of a fluid medium (preferably air) which flows past a sensing element 11. In general, the mass flow of air will result in attempting to cool the sensing element which is normally maintained at an elevated temperature. The attempted cooling of this element will be sensed by associated sensor electronics and result in providing an electrical output signal related to the amount of mass airflow. The present invention basically deals with an improved packaging for the mass airflow sensor so as to reduce the sensor cost. The specific electronic circuitry utilized to provide the electrical output signal is not especially pertinent to the present invention and therefore will not be discussed in detail. Tyically, a bridge-type circuit is used to provide a sensor signal which is then amplified.

The mass airflow sensor 10 in FIG. 1 includes a housing basically comprising upper and lower mating portions 12 and 13 which join together to form at least a portion of at least one hollow bore 14 having a longitudinal centerline 15. The hollow bore 14 is substantially surrounded by outer housing walls 16 formed by the mating portions 12 and 13. It is intended that air (the preferred fluid medium) will flow through the bore 14 substantially in a direction parallel to the longitudinal centerline 15. It should be noted that while cylindrical configurations for the housing walls 16 surrounding the bore 14 are illustrated in FIG. 1, obviously other configurations could be utilized as long as the housing provides at least one partially open portion, such as the bore 14, permitting access to the fluid medium to be sensed.

The fluid flow sensing element 11 preferably comprises a resistive film metallization deposited on a top surface 17 of a first portion 18 of a thin flexible film substrate 19. The film substrate 19 preferably comprises a 0.076 millmeter thick sheet of polyimide film, preferably Kapton. The substrate 19, plus any desired overcoat layer, should have a thickness preferably no greater than 0.150 millimeters. The reason for the thickness limitation on the Kapton film substrate is to prevent this sensing element carrier from having a substantial thermal capacity (thermal inertia) and from creating a substantial disturbance in the airflow to be sensed. Substantially, only the edge of the portion 18 of the film substrate 19 will be presented to oppose the sensed airflow.

The first film portion 18 of the Kapton substrate, which portion carries the sensing element 11, is mounted within the bore 14 with the substantially planar top surface 17 being positioned substantially parallel to the longitudinal centerline 15 of the bore 14. It should be noted that in some instances it may be desirable to provide a slight incline of the planar top surface 17 with respect to the centerline 15 to ensure that the sensed airflow properly impinges on the sensing element 11, but the planar top surface and the centerline are still contemplated as being disposed substantially parallel to one another to minimize any airflow disturbance created by the carrier substrate first portion 18 and the sensing element 11.

In addition to the sensing element 11, typically an additional resistive film metallization 20 may also be provided on the first portion 18 wherein this film comprises a reference resistor for generally sensing the ambient temperature of the fluid and adjusting power applied to resistor 11 to maintain this element at a temperature above the fluid temperature. Essentially, the present mass airflow sensor basically contemplates utilizing a control system in which electrical power is applied to the sensing element 11 to maintain it at an elevated temperature, and an electrical output signal is provided related to the amount of sensed mass airflow since for different sensed airflows different amounts of cooling of the sensing element occur. As noted before, the specific electronic circuitry utilized to provide the output sensor signal is not especially pertinent with respect to the present invention; however, the packaging of the sensor with regard to the sensing element and the asociated electrical components which respond to variations of the sensor element is significant.

Preferably there is an overcoat layer of polyimide film covering the metallizations 11 and 20. Such overcoat layer is not shown in the Figures, but is used to mechanically protect the metallizations 11 and 20.

Various sensor electrical components 21 associated with and electrically connected to the flow sensing film 11 and the reference film 20 are positioned external to the bore 14. These electrical components typically comprise a combination of discrete integrated circuit chips, chip capacitors, chip resistors, film metallization conductors and film metallization resistors, all interconnected. In addition, typically external leads 22 are provided for applying power to the electrical components 21 and bringing out the electrical output signal related to the sensed mass airflow provided by these components in combination with the sensing and reference films 11 and 20.

According to the teachings of the present invention, the Kapton film substrate 19 has an integral extension thereof extending from the first film portion 18, which is located within the bore 14, to a second film portion 23 of the film substrate 19. The first and second film portions 18 and 23, and the extension portion therebetween, are all integral portions of the film substrate 19, and for the sensor 10 illustrated in FIG. 1, all these portions are coplanar. The electrical components associated with and responding to the flow sensing film 11 by developing the electrical output signal are positioned on the second film portion 23 and are, therefore, remotely located with respect to the sensing element 11 and externally located with respect to the bore 14. A plurality of electrical conductive paths (conductive metallizations) 24 are integrally provided on the film substrate 19 and electrically connect the fluid sensing film 11 and the reference film 20 to the electrical components 21 provided on the second film portion 23.

By virtue of the above-stated features of the present invention, it is apparent that the present invention has eliminated the need for additional electrical interface structure to electrically connect the flow sensing element to its associated sensor electronics comprising the components 21. Additionally, no separate mechanical support structures (carriers) are required for both the sensing element 11 and the electronic components 21 since a common support structure, housing 12-13, is utilized. This has all been implemented while remotely locating the sensor electronic components 21 with respect to the sensing element 11, thus avoiding the components 21 adversely affecting the fluid flow to be sensed and isolating the components from the environment surrounding the sensing element. The environment surrounding the components 21 can be an amount of air separate from the air sensed by the sensor 11. This separate air, if flowing, can be used for heat dissipation purposes to conduct heat away from the components 21.

Preferably, the first film portion 18 of the film substrate 19 extends substantially across the bore 14 and has at least opposite end portions 25 and 26 in contact with and supported by the housing walls 16 which form the bore 14. More specifically, it is contemplated that preferably the housing walls 16 of the upper and lower housing portions 12 and 13 will clamp the opposite end portions 25 and 26 of the first film portion 18 therebetween, thus ensuring proper alignment and support of the first film portion 18. To assist in mounting the first film portion 18 in the bore 14, alignment notches/projections 27 have been provided in the opposite end portions 25 and 26 of the first film portion and mate with corresponding projections/notches 28 in the housing walls 16 which mate together to clamp the first film portion 18 therebetween. Preferably, the housing portions 12 and 13 each include an essentially C-shaped portion forming a portion of the housing walls 16 which form the bore 14.

The housing portions 12 and 13 also, when mated together, form a cavity 29 which is separate from the bore 14 and preferably isolated from the environment provided within the bore 14. The second film portion 23 of the flexible film substrate is positioned within this cavity 29, and this results in the housing providing protection for the electrical components 21 that are part of the sensor electronics. Of course, one or more openings, such as opening 29A, are provided in the housing to permit the leads 22 to be externally accessible. The portion of the housing portion 12 surrounding the leads 22 and opening 29A effectively forms a connector for the power supply and sensor output signals, with the leads 22 corresponding to connector terminals.

By the above-recited structure, the present invention has utilized the housing of the sensor to ensure proper mounting and alignment of the sensing element 11 while also providing protection for the associated sensor electronics, and this has all been accomplished without requiring additional interface lead structure to connect the sensing element to the sensor electronics. This has been achieved by essentially providing the sensor electronics on an extension of the flexible film substrate on which the sensing element for mass airflow has been mounted. It should be noted that techniques for implementing the desired metallizations on a thin flexible substrate, such as the substrate 19, are well known, and, therefore, these techniques will not be further discussed. In addition, it is noted that preferably attaching an integrated circuit, as one of the components 21, to metallizations on a thin flexible Kapton substrate can be accomplished by conventional tape automated bonding operations. Reflow soldering operations could be utilized to mount discrete chip capacitors, resistors and semiconductor devices to conductive metallizations on the second film portion 23.

Preferably, the metalizing of the Kapton substrate 19, and the assembly of all components to the second film portion 23 will be implemented while the first and second film portions 18 and 23 of the film substrate are coplanar. Subsequently, if desired, the first and second film portions may be oriented at non-coplanar relationships in order to obtain a desired form factor. This represents no problem since the conductive path metallizations 24 between the first and second film portions 18 and 23 will not rupture during the bending of the thin flexible Kapton film. Such Kapton film is conventionally used in flexible printed circuits which are bendable.

It should be noted that the lower housing portion 13 is contemplated as including at least one planar support wall 13A against which a planar surface of the second film portion 23 is mounted, the components 21 being mounted on a side of the film portion 23 opposite from the planar side mounted to the support wall 28. Of course, this mounting can be either directly implemented, or indirectly implemented if an interface layer is desired to be placed between the planar wall 13A and the planar surface of the film portion 23 opposite the side on the which the components 21 are mounted. If no interface layer is provided, or if a thermally conductive interface layer is provided, then, since preferably the housing portions 12 and 13 are metallic and thermally conductive, the planar wall 13A can serve as a heatsink for the components 21 with heat passing through the thin Kapton film portion 23. In addition, air which flows external to the bore 14 can be used to cool the housing portions 12 and 13 and therefore cool the components 21 and provide effective heat sinking for these components.

As illustrated in FIG. 1, an outer cylindrical housing may be provided which essentially surrounds the cylindrical housing walls 16 and the bore 14. This outer cylindrical housing can be formed by essentially C-shaped portions 30 and 31 which mate together and form a cylindrical tubular structure having the bore 14 within this tubular structure. Additional side support projections 32 and 33 can be utilized to provide additional support for the sensor module which comprises the components 11 through 29A.

Figure 2:
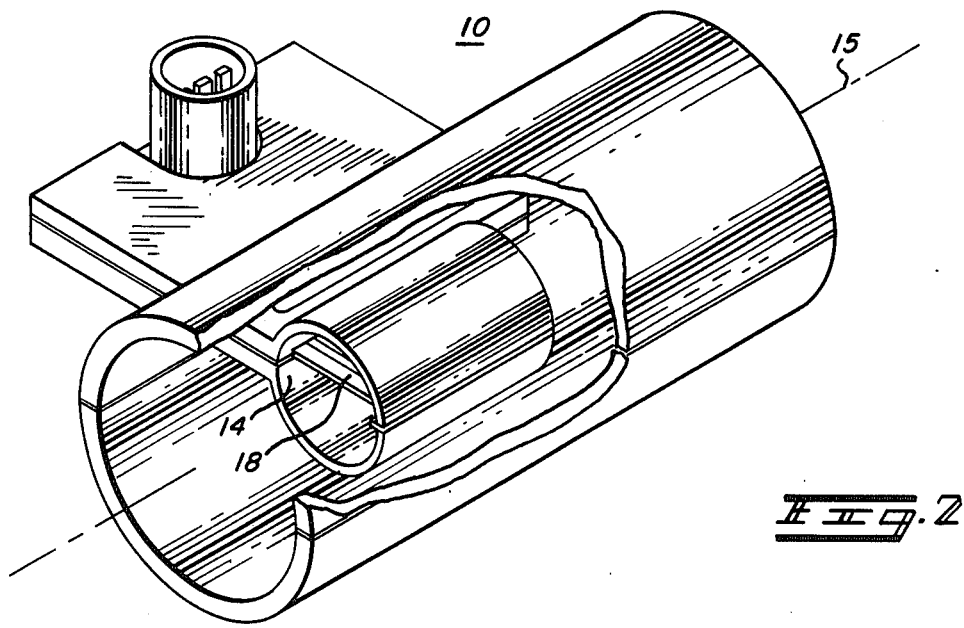
FIG. 2 comprises a partially broken-away, perspective view of the assembled mass airflow sensor shown in FIG. 1.

FIG. 2 illustrates the structure in FIG. 1 in a final assembly configuration with a portion of the outer wall of the outer housing element 30 being broken away.

Figure 3:
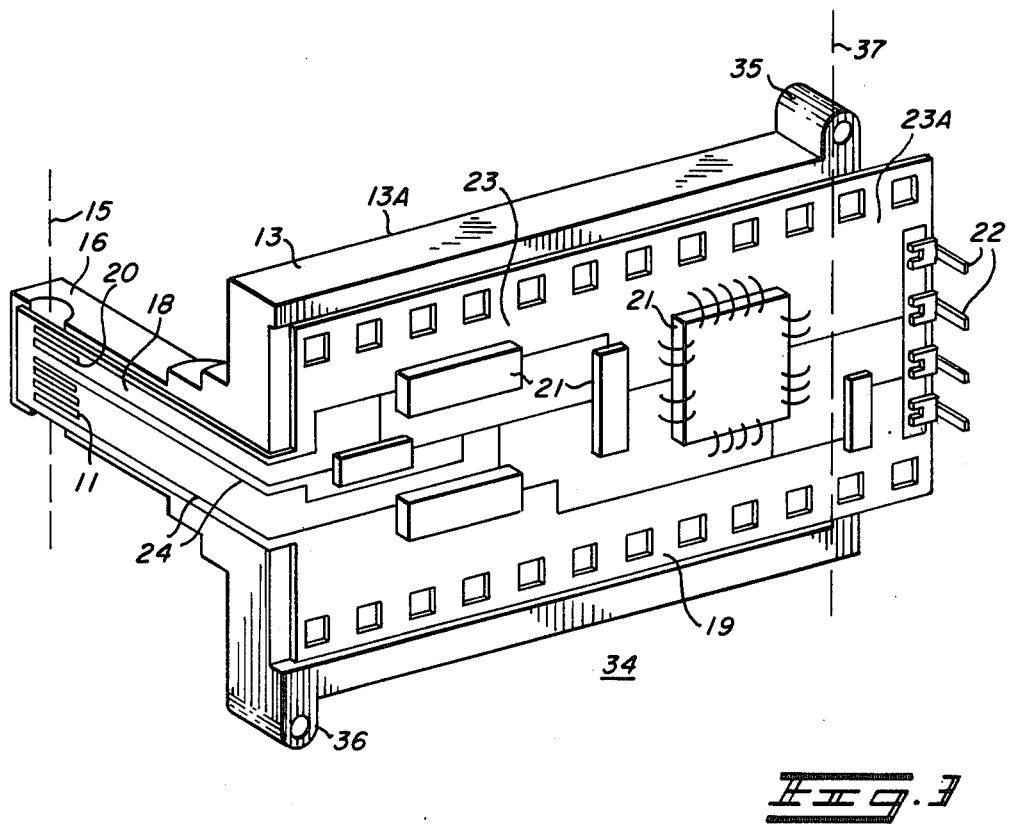
FIG. 3 is a perspective view of a portion of another embodiment of a mass airflow sensor prior to assembly.

FIG. 3 illustrates another embodiment for a portion of a mass airflow sensor 34 similar to the sensor 10. In FIG. 3 corresponding elements have been identified by reference numbers identical to those in FIG. 1. Essentially, the basic difference between the mass airflow sensor shown in FIG. 3 and the sensor 10 shown in FIG. 1 is that the first and second film portions 18 and 23, while each still being planar, are now oriented perpendicular with respect to one another so as to implement a different form factor. In addition, mounting tab projections 35 and 36 are provided on the housing portion 13 so as to permit mounting the housing portion to an external heatsink. It should be noted that in FIG. 3 it is contemplated that the second film portion 23A will be folded along the dashed line 37 so that an end portion 23 will be perpendicular to the remaining portion of the second film portion 23. This is also to achieve an improved form factor.

FIG. 4 illustrates planar views of an assembled version of the mass airflow sensor shown in FIG. 3. The sensor in FIGS. 3 and 4 is not illustrated with the outer housing represented by the components 30–33 shown in FIGS. 1 and 2.

FIGS. 5 and 6 illustrate another sensor embodiment utilizing many of the above-noted principles of the present invention. In FIG. 5, a self-powered airflow sensor 50 is illustrated, and contains many elements corresponding to those of the mass airflow sensor 10 shown in FIG. 1. In particular, again a flexible, thin, film substrate 19 is provided having a sensing film 11 mounted on a first film portion 18. It should be noted that identical reference numbers are utilized for components of the sensor 50 which correspond to similar components of the sensor 10 in FIG. 1.

For the sensor 50, a second planar film portion 23 is provided and represents an extension of the film substrate 19 that is located remote form the first film portion 18 which carries the sensing element 11. Again, electrical interconnections between the sensing element 11 and associated sensor components 21 on the second film portion 23 are provided by electrical conductive metallizations 24 integrally provided on the film substrate 19. For the sensor 50, the housing portions 12 and 13 generally correspond to half cylinders which mate together, and again half cylinder walls 16 of the housing portions 12 and 13 form a cavity 29 in which the second film portion 23 and electrical components 21 are positioned, wherein preferably this cavity is isolated from the environment surrounding the sensing element 11.

For the sensor 50, end portions 51 and 52 of the housing portions 12 and 13 are provided. Each of these end portions essentially comprise a screen mesh portion 51A and 52A, respectively, which extends between solid portions of the housing portions 12 and 13, and far end solid portions 51B or 52B of 12 and 13, respectively. 51B and 52B correspond to the far end of the sensor 50. When the housing portions 12 and 13 are mated together, the screen mesh portions 51A and 52A will permit the entrance of air, or some other fluid to be measured, so as to surround the sensing element 11 in the appropriate environment which is to be sensed. For the sensor 50, the first film portion 18 is now no longer planar in configuration, but is arranged essentially in a cylindrical form, and an inner support tube structure 53 is provided within the cylindrical formed by the film portion 18 for support purposes.

It should be noted that the sensor 50 is contemplated as being self-powered since a battery 54 is provided within a cavity 55 formed by the housing portions 12 and 13. The battery corresponds to a conventional penlight battery and supplies operative power to the components 21. In addition, a visual display readout device 56, preferably comprising an LCD display device, is provided on and connected to metallizations on the second film portion 23, and a view opening 57 is provided for a visual surface of this device in the housing portion 12. In addition, a display activation pushbutton 58 is also provided and coupled to metallizations on the film portion 23. The pushbutton will activate the display device 56 upon the application of manual pressure. Thus a completely self-contained sensor is provided which does not require any output lead structure.

Preferably the housing portion 13 in sensor 50 is thermally conductive and provides a curved surface 13B to which the bottom surface, opposite top surface 17, of the film portion 23 is to be attached. This provides a heatsink for the components 21.

While specific embodiments of the present invention have been shown and described, further modifications and improvements will occur to those skilled in the art. All such modifications which retain the basic underlying principles disclosed and claimed herein are within the scope of this invention.

We claim:

1. A sensor for providing an electrical signal related to at least one sensed property of a fluid, which may comprise air, comprising:

housing means having at least one at least partially open portion permitting access to a fluid to be sensed;

fluid sensing element deposited on a top surface of a first portion of a thin flexible film substrate;

said film first portion, carrying said sensing element, mounted in said at least partially open portion of said housing means and mounted in and surrounded by said fluid to be sensed;

electrical components, other than electrical conductors, positioned external to and remote from said at least partially open portion of said housing means and electrically connected to said sensing element, said electrical components providing an electrical signal related to the fluid sensed by said sensing element;

said film substrate having an integral extension thereof extending from said first film portion within said at least partially open portion of said housing means to a second portion of said film substrate integral with said first film portion but positioned exterior to said at least partially open portion of said housing means, said electrical components mounted on said second film portion; and electrical conductive metallizations provided on said film and electrically connecting said fluid sensing element on said first film portion to said electrical components mounted on said second portion;

wherein said housing means, in addition to forming said at least partially open portion of said housing means, also forms a separate cavity, the walls of said cavity providing protection for said electrical components which are positioned within said cavity and said walls clamping said integral extension of said flexible film substrate therebetween and substantially isolating said components from the sensed fluid surrounding said sensing element;

whereby additional nonintegral electrical interface structure is not required to connect the fluid sensing element to the remotely located electrical components which form the remaining portion of the sensor electronics;

wherein said first film portion extends substantially across said at least partially open portion of said housing means and has at least opposite end portions coupled to and supported by walls of said housing means, wherein said housing means has at least two mating portions which join together, and wherein at least one of said opposite end portions of said first film portion is clamped between said two mating portions; and wherein said clamped portion of said first film portion has alignment notches/projections therein which mate with corresponding projections/notches in said mating portions, whereby proper alignment and support of said first film portion in said housing means is achieved.

2. A sensor according to claim 1 wherein said fluid sensing element comprises at least one resistive metallization deposited on said top surface, and wherein said flexible film substrate comprises a polyimide film.

3. A sensor according to claim 1 which includes a power source mounted within said housing means and connected to said conductive metallizations on said second film portion.

4. A sensor according to claim 3 which includes a visual display device mounted to said second film portion, said housing means having an opening therein to permit viewing of a surface of said visual display device.

5. A sensor for providing an electrical signal related to at least one sensed property of a fluid, which may comprise air, comprising:

housing means having at least one at least partially open portion permitting access to a fluid to be sensed;

fluid sensing element deposited on a top surface of a first portion of a thin flexible film substrate;

said film first portion, carrying said sensing element, mounted in said at least partially open portion of said housing means;

electrical components positioned external to and remote from said at least partially open portion of said housing means and electrically connected to said sensing element, said electrical components providing an electrical signal related to the fluid sensed by said sensing element;

said film substrate having an integral extension thereof extending from said first film portion within said at least partially open portion of said housing means to a second portion of said film substrate integral with said first film portion but positioned exterior to said at least partially open portion of said housing means, said electrical components mounted on said second film portion; and electrical conductive metallizations provided on said film and electrically connecting said fluid sensing element on said first film portion to said electrical components mounted on said second portion;

wherein said housing means, in addition to forming said at least partially open portion of said housing means, also forms a separate cavity, the walls of said cavity providing protection for said electrical components which are positioned within said cavity and substantially isolating said components from the sensed fluid surrounding said sensing element;

whereby additional nonintegral electrical interface structure is not required to connect the fluid sensing element to the remotely located electrical components which form the remaining portion of the sensor electronics;

wherein said flexible film substrate comprises a polyimide film and wherein said cavity walls include at least one support wall against which a surface of said second film portion is mounted, said components being mounted on a surface of said second film portion opposite the surface mounted to said support wall, and wherein said support wall is thermally conductive and forms a heatsink for said components.

6. A mass flow sensor for providing an electrical signal related to the mass flow rate of a fluid, which may comprise air, flowing past a sensing element, comprising:

housing means having at least one hollow bore, having a longitudinal centerline, surrounded by housing walls, fluid intended to flow through said bore substantially in a direction parallel to the longitudinal centerline of said bore;

fluid flow sensing element deposited on a top surface of a first portion of a thin flexible film substrate;

said first film portion, carrying said sensing element, mounted in said bore and mounted in and surrounded by said fluid to be sensed;

electrical components, other than electrical conductors, positioned external to said bore and electrically connected to said sensing element, said electrical components providing an electrical signal related to the fluid mass flow sensed by said sensing element;

said film substrate having an integral extension thereof extending from said first film portion within said bore to a second portion of said film substrate integral with said first film portion but positioned exterior to said bore, said electrical components mounted on said second film portion; and electrical conductive paths integrally provided on said film substrate and electrically connecting said fluid sensing element on said first film portion to said electrical components mounted on said second film portion;

wherein said housing means, in addition to forming said fluid flow bore, also forms a cavity separate from said bore, the walls of said cavity providing protection for said electrical components which are positioned within said cavity and said walls clamping said integral extension of said flexible film substrate therebetween and substantially isolating said components from the sensed fluid surrounding said sensing element;

whereby additional nonintegral electrical interface structure is not required to connect the fluid sensing element to the remotely located electrical components which form the remaining portion of the sensor electronics;

wherein said first film portion extends substantially across said bore and has at least opposite end portions in contact with and supported by said housing means walls, wherein said housing means has at least two mating housing portions which join together to form at least a portion of said bore, and wherein said opposite end portions of said first film portion are clamped between said two mating housing portions; and wherein said clamped portions of said first film portion have alignment notches/projections therein which mate with corresponding projections/notches in said mating portions, whereby proper alignment and support of said first film portion in said bore is achieved.

7. A mass flow sensor according to claim 6 wherein said top surface of said first film poriton is substantially planar and positioned substantially parallel to said longitudinal centerline of said bore.

8. A mass flow sensor according to claim 6 wherein said fluid flow sensing element comprises at least one resistive metallization deposited on said top surface.

9. A mass flow sensor according to claim 6 wherein said fluid flow sensing element comprises at least one resistive metallization deposited on said top surface, wherein said electrical conductive paths comprise conductive metallizations deposited on said film substrate, and wherein said flexible film substrate comprises a sheet of polyimide film.

10. A mass flow sensor according to claim 9 wherein said film substrate has a thickness no greater than 0.150 millimeters.

11. A mass flow sensor according to claim 10 wherein said components comprise discrete devices attached to conductive paths on said second film portion.

12. A mass flow sensor according to claim 11 wherein said cavity walls include at least one planar support wall against which a planar surface of said second film portion is mounted, said components being mounted on a side of said second film portion opposite the planar portion mounted to said support wall.

13. A mass flow sensor according to claim 6 which includes a connector having terminals corresponding to power supply and output signal leads connected to conductive metallizations on said second film portion.

14. A mass flow sensor according to claim 6 wherein said housing means comprises two mating portions each having a generally half cylinder shape with at least one having an extending projection having a planar support surface to which a planar surface of said second film portion is planarly coupled to.

15. A mass flow sensor for providing an electrical signal related to the mass flow rate of a fluid, which may comprise air, flowing past a sensing element, comprising:

housing means having at least one hollow bore, having a longitudinal centerline, surrounded by housing walls, fluid intended to flow through said bore substantially in a direction parallel to the longitudinal centerline of said bore;

fluid flow sensing element deposited on a top surface of a first portion of a thin flexible film substrate;

said first film portion, carrying said sensing element, mounted in said bore;

electrical components positioned external to said bore and electrically connected to said sensing element, said electrical components providing an electrical signal related to the fluid mass flow sensed by said sensing element;

said film substrate having a integral extension thereof extending from said first film portion within said bore to a second portion of said film substrate integral with said first film portion but positioned exterior to said bore, said electrical components mounted on said second film portion; and electrical conductive paths integrally provided on said film substrate and electrically connecting said fluid sensing element on said first film portion to said electrical components mounted on said second film portion;

wherein said housing means, in addition to forming said fluid flow bore, also forms a cavity separate from said bore, the walls of said cavity providing protection for said electrical components which are positioned within said cavity and substantially isolating said components from the sensed fluid surrounding said sensing element;

whereby additional nonintegral electrical interface structure is not required to connect the fluid sensing element to the remotely located electrical components which form the remaining portion of the sensor electronics;

wherein said top surface of said first film portion is substantially planar and positioned substantially parallel to said longitudinal centerline of said bore;

wherein said first film portion extends substantially across said bore and has at least opposite end portions in contact with and supported by said housing means walls, wherein said housing means has at least two mating housing portions which join together to form at least a portion of said bore, and wherein said opposite end portions of said first film portion are clamped between said two mating housing portions;

wherein said fluid flow sensing element comprises at least one resistive metallization deposited on said top surface, wherein said electrical conductive paths comprise conductive metallizations deposited on said film substrate, and wherein said flexible film substrate comprises a sheet of polyimide film;

wherein said components comprise discrete devices attached to conductive paths on said second film portion;

wherein said cavity walls include at least one planar support wall against which a planar surface of said second film portion is mounted, said components being mounted on a side of said second film portion opposite the planar portion mounted to said support wall;

wherein said first and second film portions are each substantially planar and are disposed noncoplanar while still being integrally connected.

16. A mass flow sensor for providing an electrical signal related to the mass flow rate of a fluid, which may comprise air, flowing past a sensing element, comprising:

housing means having at least one hollow bore, having a longitudinal centerline, surrounded by housing walls, fluid intended to flow through said bore substantially in a direction parallel to the longitudinal centerline of said bore;

fluid flow sensing element deposited on a top surface of a first portion of a thin flexible film substrate;

said first film portion, carrying said sensing element, mounted in said bore;

electrical components positioned external to said bore and electrically connected to said sensing element, said electrical components providing an electrical signal related to the fluid mass flow sensed by said sensing element;

said film substrate having an integral extension thereof extending from said first film portion within said bore to a second portion of said film substrate integral with said first film portion but positioned exterior to said bore, said electrical components mounted on said second film portion; and electrical conductive paths integrally provided on said film substrate and electrically connecting said fluid sensing element on said first film portion to said electrical components mounted on said second film portion;

wherein said housing means, in addition to forming said fluid flow bore, also forms a cavity separate from said bore, the walls of said cavity providing protection for said electrical components which are positioned within said cavity and substantially isolating said components from the sensed fluid surrounding said sensing element;

whereby additional nonintegral electrical interface structure is not required to connect the fluid sensing element to the remotely located electrical components which form the remaining portion of the sensor electronics;

wherein said top surface of said first film portion is substantially planar and positioned substantially parallel to said longitudinal centerline of said bore;

wherein said first film portion extends substantially across said bore and has at least opposite end portions in contact with and supported by said housing means walls, wherein said housing means has at least two mating housing portions which join together to form at least a portion of said bore, and wherein said opposite end portions of said first film portion are clamped between said two mating housing portions;

wherein said fluid flow sensing element comprises at least one resistive metallization deposited on said top surface, wherein said electrical conductive paths comprise conductive metallizations deposited on said film substrate, and wherein said flexible film substrate comprises a sheet of polyimide film;

wherein said components comprise discrete devices attached to conductive paths on said second film portion;

wherein said cavity walls include at least one planar support wall against which a planar surface of said second film portion is mounted, said components being mounted on a side of said second film portion opposite the planar portion mounted to said support wall;

wherein said planar support wall is thermally conductive, this providing effective heatsinking for said components.

17. A mass flow sensor according to claim 16 wherein said planar support wall is thermally coupled to a cooling fluid flow separate from the fluid flow through said bore.

* * * * *